(12) United States Patent
Liang et al.

(10) Patent No.: US 11,507,850 B2
(45) Date of Patent: Nov. 22, 2022

(54) SYSTEM AND METHOD FOR CALL CENTRE MANAGEMENT

(71) Applicant: ROYAL BANK OF CANADA, Montreal (CA)

(72) Inventors: Carolyn Liang, Toronto (CA); Hannah McIsaac, Toronto (CA); Jane Lor, Toronto (CA); Sheldon Ho, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 685 days.

(21) Appl. No.: 16/541,631

(22) Filed: Aug. 15, 2019

(65) Prior Publication Data
US 2020/0074312 A1    Mar. 5, 2020

Related U.S. Application Data
(60) Provisional application No. 62/764,682, filed on Aug. 15, 2018.

(51) Int. Cl.
*G06N 5/02*     (2006.01)
*G06Q 30/00*    (2012.01)
*G06F 40/30*    (2020.01)

(52) U.S. Cl.
CPC .............. *G06N 5/02* (2013.01); *G06F 40/30* (2020.01); *G06Q 30/016* (2013.01)

(58) Field of Classification Search
CPC .......... G06N 5/02; G06N 3/0445; G06N 3/04; G06N 7/005; G06N 7/00; G06N 20/00; G06N 20/20; G06F 40/30; G06F 40/35; G06F 40/20; G06F 16/3329; G06F 16/35; G06F 16/353; G06F 16/355; G06F 16/9535; G06F 16/24522; G06F 16/3344; G06F 16/951; G06F 17/2785; G06Q 30/016; G06Q 30/00; G06Q 30/0201; G06Q 30/02; G06Q 10/06; G09B 5/04; H04M 3/5175; G10L 15/063
USPC ...................................................... 704/1–9
See application file for complete search history.

(56) References Cited

U.S. PATENT DOCUMENTS

| | | | |
|---|---|---|---|
| 10,467,547 B1* | 11/2019 | Range | G06N 20/00 |
| 10,631,257 B1* | 4/2020 | Serero | H04M 3/523 |
| 2010/0138452 A1* | 6/2010 | Henkin | G06Q 30/02 |
| | | | 707/803 |
| 2016/0078245 A1* | 3/2016 | Amarendran | G06N 20/00 |
| | | | 713/193 |

(Continued)

FOREIGN PATENT DOCUMENTS

CN    104216979 A  * 12/2014  ....... G06F 17/30707

*Primary Examiner* — Leshui Zhang
(74) *Attorney, Agent, or Firm* — Norton Rose Fulbright Canada LLP

(57) ABSTRACT

A system receives data associated with a communication between one or more individuals. The data is split between each of the one or more individuals into text associated with that individual. Each of the text is modified to remove stop words and to duplicate key words. The text is merged to form a text corpus, from which a bag of words model is generated. Topics of the bag of words are classified using a topic classifier model. A purpose is identified based on the returned topic and keywords from the topic classifier model. Returned topics and keywords from the topic classifier model are linked to the communication.

20 Claims, 7 Drawing Sheets

(56) References Cited

U.S. PATENT DOCUMENTS

| | | | |
|---|---|---|---|
| 2016/0078361 A1* | 3/2016 | Brueckner | H04L 67/10 |
| | | | 706/12 |
| 2016/0336006 A1* | 11/2016 | Levit | G10L 15/14 |
| 2018/0075323 A1* | 3/2018 | Kouchnir | G06F 16/951 |
| 2018/0253416 A1* | 9/2018 | Crouse | G06Q 50/184 |
| 2019/0180175 A1* | 6/2019 | Meteer | G06N 20/00 |
| 2020/0193353 A1* | 6/2020 | Weisman | G06Q 10/06393 |
| 2020/0218781 A1* | 7/2020 | Takano | G06Q 30/016 |
| 2020/0219495 A1* | 7/2020 | Alkan | G10L 15/22 |

* cited by examiner

SYSTEM AND METHOD FOR CALL CENTRE MANAGEMENT

FIELD

This relates generally to analysis of communications, for example voice calls, between individuals such as a client and an agent of a call centre, and in particular, call centre management for call labelling and prediction.

BACKGROUND

In a call centre (for example, an advice centre), communication may occur between one or more individuals such as a client and an agent of the call centre, for example, in the form of a voice call between the client and the agent.

Traditionally, call centres use techniques such as a point estimate model, averaging, and a time series approach to identify or label calls and to forecast future calls.

However, call centres may receive a large volume of call data related to a voice call, and this data may be in a format that is difficult to process.

Accordingly, there is a need for improved processing of call data to allow for labeling of calls received and prediction or forecasting of future calls.

SUMMARY

According to an aspect, there is provided a computer-implemented method for classifying a topic of a communication using a topic classifier model, the method comprising: receiving data associated with a communication between one or more individuals; splitting the data between each of the one or more individuals into text associated with that individual; modifying the text associated with each individual by removing stop words and duplicating key words; merging the modified text associated with each individual to form a text corpus; generating a bag of words model of the text corpus; classifying topics of the bag of words using the topic classifier model; identifying a purpose based on the returned topic and keywords from the topic classifier model; and linking returned topics and keywords from the topic classifier model to the communication.

In some embodiments, the computer-implemented method further comprises: building a document term matrix based on the text corpus and a frequency of terms that occur in the text corpus; classifying topics of the document term matrix using the topic classifier model.

In some embodiments, the topic classifier model includes latent Dirichlet allocation (LDA).

In some embodiments, topics and number of topics are predetermined.

In some embodiments, the stop words are defined by a predetermined stop words list.

In some embodiments, the modifying the text associated with each individual comprises one or more of: tokenizing the text by splitting the text into sentences and the sentences into words and making the words lowercase and removing punctuation; removing words from the text that have fewer than three characters; lemmatizing words in the text by changing words in the third person to first person and verbs in past and future tenses are changed into present; and stemming words in the text by reducing the words to root form.

In some embodiments, the computer-implemented method further comprises: linking the topic classifier model to other data sources.

In some embodiments, the other data sources include at least one of call centre data, customer demographics, and mobile and website statistics.

In some embodiments, the computer-implemented method further comprises: applying principal component analysis to the data and the other data sources to generate principal components; applying a topic prediction model to the principal components to predict what topics an individual would call about.

In some embodiments, the computer-implemented method further comprises: applying 5-fold cross validation to the principal components to generate a 5-fold validated training set In some embodiments, the computer-implemented method further comprises: during a training phase, building the text corpus from training data including multiple communications.

In some embodiments, the computer-implemented method further comprises: clustering individuals based on the purpose associated with the individual.

In some embodiments, the clustering includes performing k-means unsupervised machine learning.

In some embodiments, the computer-implemented method further comprises: defining customer groups based on the clustering.

In some embodiments, the computer-implemented method further comprises: applying the purpose model to a call prediction model to predict if an individual will call an organization.

In some embodiments, the call prediction model includes a random forest.

In some embodiments, the call prediction model includes long short-term memory (LSTM).

In some embodiments, the one or more individuals include a client and an agent at a call centre and the data is voice-to-text data.

According to another aspect, there is provided a computer system comprising: a processor; a memory in communication with the processor, the memory storing instructions that, when executed by the processor cause the processor to perform the method as described herein.

According to a further aspect, there is provided a non-transitory computer-readable medium having computer executable instructions stored thereon for execution by one or more computing devices, that when executed perform the method as described herein.

Embodiments described herein may examine and label past call purposes, and once labeled, examine behaviour that lead the client to call the call centre, and use patterns and behaviour to predict future calls.

Machine learning is field of computer science that configures computing devices to process data using programming rules and code that can dynamically update over time. Machine learning involves programming rules and code that can detect patterns and generate output data that represents predictions or forecasting.

By using machine learning techniques disclosed herein, in an example, assisted machine learning, it may be possible to predict advice centre volumes, gain insights into why customers contact a call centre, and as such, provide insights allowing a call centre to drive lower time to resolve and reduce self-service abandonment.

Other features will become apparent from the drawings in conjunction with the following description.

BRIEF DESCRIPTION OF DRAWINGS

In the figures which illustrate example embodiments.

DETAILED DESCRIPTION

A call centre can be a centralized office or interface to receive and/or transmit a large volume of telephone calls, operated on behalf of an organization or company such as a banking institution. A client may be, for example, a customer of a banking institution. A call centre may be used for customer service or outgoing sales calls.

Communications may be between one or more individuals, such as a client and an agent at a call centre, or another interaction between client and other services that allow a client to interact with an organization, for example, a website or mobile application, and can include, for example, voice calls, video calls, messaging sessions, exchanges of emails, client interaction with various parts of an organization's website. All of these communications or interactions are part of a "client journey".

A "purpose" of communications or conversations, such as a "call purpose" may be defined as the reason for the client's call to the call centre, or a problem the client is seeking to address. For example, a call purpose may be to report a lost or stolen credit card.

As described in further detail below, systems and methods disclosed herein provide for topic modelling using a topic classifier model to determine what a call is about by identifying topics in the call data; prediction using a topic prediction model to determine why an individual is calling; and a call prediction model to predict if an individual will call.

Figure 1:
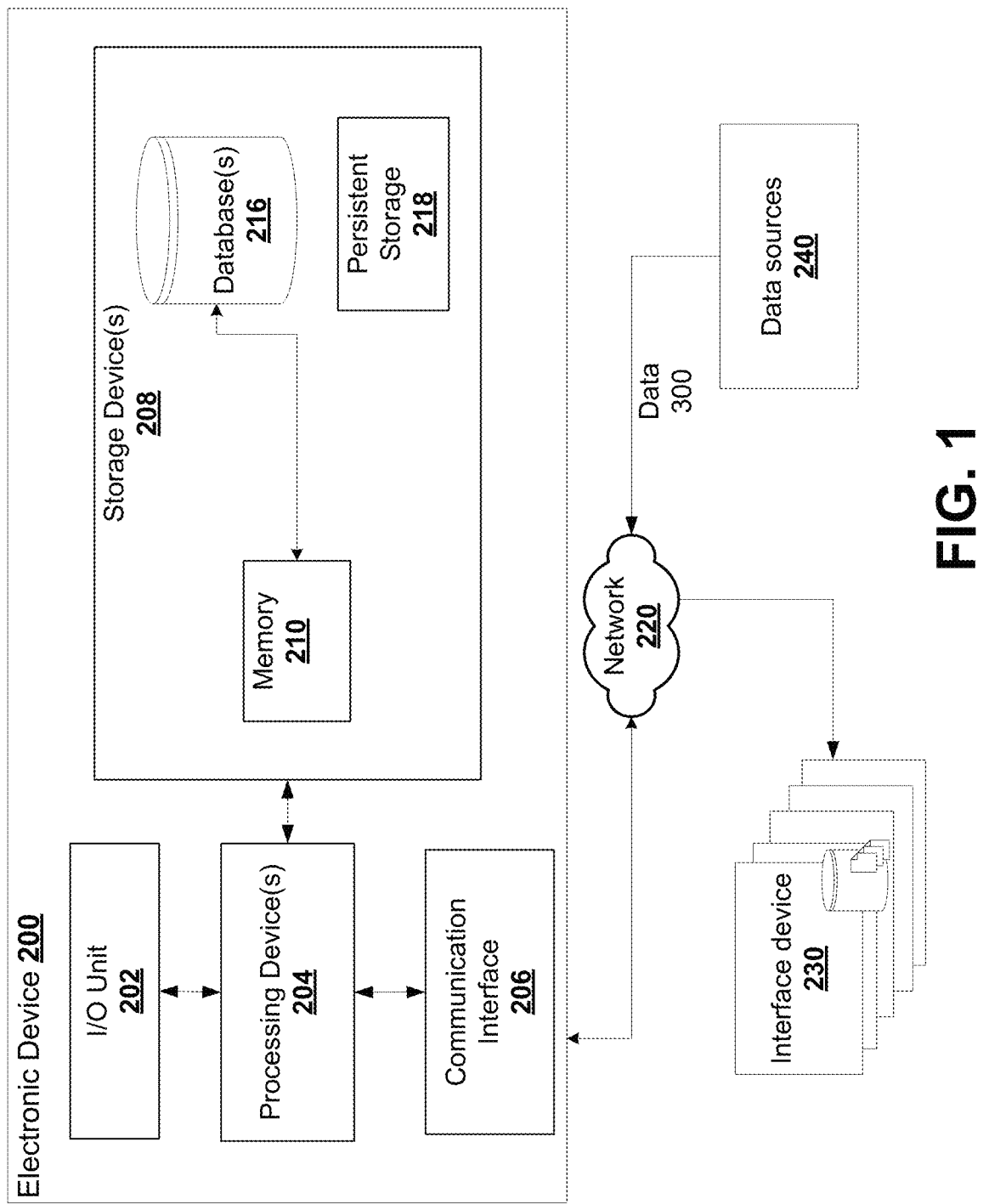
FIG. 1 is a schematic block diagram of a system for machine learning topic modelling, according to an embodiment.

FIG. 1 shows a system 100 for machine learning call purpose and forecasting. The system 100 has an electronic device 200 connected to interface device 230 and data sources 240 via network 220.

Figure 2:
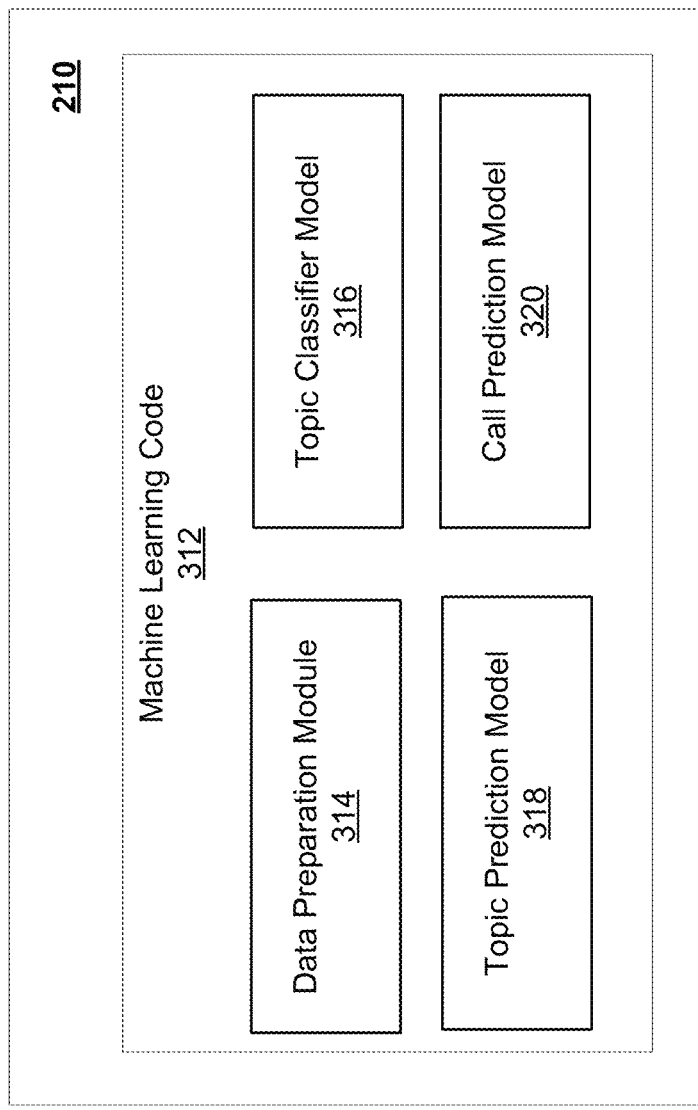
FIG. 2 illustrates the organization of software at the computing device of FIG. 1, according to an embodiment.

FIG. 2 depicts a simplified organization of example software components and data stored within memory 210 of electronic device 200. As illustrated, these software components include machine learning code 212 including data preparation module 314, a topic classifier model 316, for example, a latent Dirichlet allocation (LDA) model, a topic prediction model 318, and a call prediction model 320.

The electronic device 200, for example, a computing device, can include an I/O unit 202, processing device(s) 204, communication interface 206, and storage device(s) 208. The electronic device 200 can connect with one or more interface devices 230 or data sources 240. This connection may be over a network 220 (or multiple networks). The electronic device 200 receives and transmits data from one or more of these via I/O unit 111. When data is received, I/O unit 111 transmits the data to processing device 112.

Each I/O unit 111 can enable the electronic device 200 to interconnect with one or more input devices, such as a keyboard, mouse, camera, touch screen and a microphone, and/or with one or more output devices such as a display screen and a speaker.

A processing device 204 can execute instructions (e.g., machine learning code 212) in memory 210 to configure electronic device 200. The processing device 204 can dynamically update machine learning code 212. A processing device 204 can be, for example, any type of general-purpose microprocessor or microcontroller, a digital signal processing (DSP) processor, an integrated circuit, a field programmable gate array (FPGA), a reconfigurable processor, or any combination thereof.

The storage device 208 can include memory 210, databases 216 and persistent storage 218. Memory 210 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 210 can include machine learning code 312 with data preparation module 214 and rules and models such as topic classifier model 316 and topic prediction model 318. Machine learning code 312 can refine based on learning. Machine learning code 312 can include instructions to implement an artificial neural network.

Each communication interface 206 can enable the electronic device 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The electronic device 200 can be operable to register and authenticate users (using a login, unique identifier, and password for example) prior to providing access to applications, a local network, network resources, other networks and network security devices. The system 100 may serve one user or multiple users.

The storage device 208 may be configured to store information associated with or created by the machine learning code 212. Storage 208 and/or persistent storage 218 may be provided using various types of storage technologies, such as solid state drives, hard disk drives, flash memory, and may be stored in various formats, such as relational databases, non-relational databases, flat files, spreadsheets, extended markup files, etc.

Returning to FIG. 2, machine learning code 312 may include one or more submodules. As illustrated, in some embodiments, machine learning code 312 includes data preparation module 314 for structuring data from raw data sources 240 and use the prepared data to train topic classifier model 316 and topic prediction model 318.

The operation of machine learning code 312, in particular, data preparation module 314, is described below. The operation of topic classifier model 316 is described with reference to the flowchart of FIG. 3.

Data preparation module 314 is called when data is collected from data sources 240 to train topic classifier model 316.

There are a number of data sources 240 which may provide data relating to the communication between a client and an organization.

Data sources 240 can include, for example, call centre data, customer demographics, mobile and website statistics, voice to text data, and natural language processing.

Call centre data may include information on the voice call transaction such as type of call, such as time of the call, Interactive Voice Response (IVR) selection, and transfers. IVR data may include data such as touch-tone entries in the use of touch-tone telephone to interact with database to acquire information or enter data into database, captured by the telephony system used in the voice call.

Customer demographics may include a comprehensive overview on the type of customer. In an example, customer demographics may include statistical data relating to a group of customers, based on factors such as income, age, race and sex.

Mobile and website statistics such as Google Analytics™ may be used to track website navigation and mobile application usage, and detail the mobile aspect of a client's journey, and identify, for example, interactions per page, error messages and crashes.

Voice-to-text data provides the content from a voice call, for example by processing an audio recording of the voice call using Verint™ for speech recognition of the client and agent from the voice call.

Natural language processing of the voice to text data, for example, may be performed by a Parlay natural language understanding (NLU) unit. In some embodiments, natural language processing may be performed on voice-to-text data before topic modelling is performed, as discussed below.

Data sources 240 may be used to predict call purpose and identify detailed client journeys.

In some embodiments, a purpose is assigned to a communication or a conversation, for example, a call purpose of a call, using topic modelling, as described in further detail below.

Following topic modeling of voice-to-text data from which a call purpose may be determined, the results may then be combined with other data sources to examine overall trend analysis of a client journey, cluster client behaviour, and predict future call volume and behaviour, as described in further detail below. Conveniently, this may tie together these various sources of data in an improved way.

The operation of data preparation module 314 of machine learning code 312, performed by processing device(s) 204, is described below.

Data preparation module 314 may be configured to build a stop words list, and identify key words to emphasize, as described in further detail below.

Word frequencies may be studied and custom stop lists were developed to eliminate low-value-add words from transcripts of agent and client calls. Key words in transcript data may be repeated to emphasize words from a custom list of special emphasis words and also through repeating the set of words in the intersection of what both agents and clients said.

In some embodiments, data preparation module 314 may be used to generate training data for one or more of topic classifier model 316, topic prediction model 318, and call prediction model 320.

A "stop words" list may provide a list of words to be filtered out of the voice-to-text data during the modelling process. These are often common words in a language.

A stop words list may be built based on identification of words to be eliminated from the data sat prior to topic modelling.

The stop words list may contain words that do not add meaning in the context of identifying a call purpose, for example, words such as "you", "all" and "are". In some embodiments, these stop words may be characterized as "meaningless" in the context of call purpose.

Many clients in a call centre conversation may be calling for help, and use words such as "thanks", "want", and "help", which are less important, as they appear in most of the conversations. Words that appear regularly across most conversation may be less useful in identifying call purpose, and as such, may be added to a stop words list.

In some embodiments, the stop words list may be generated with more words than in conventional stop words lists. In an example, a hundred stop words may be selected by observation.

In some embodiments, words for a stop list may be identified by use of a function to count instances of words which occur very frequently in conversations, such as "how" "no problem", and these words may be selected for inclusion in a stop list.

A "key words" list may identify key words that are to be emphasized.

Key words to emphasize may be identified based on observations. By interviewing agents and identifying what could be reasons for calls. For example, a client may call a banking institution to "add payee" or "report lost card". Therefore, these are words that the model should emphasize and prioritize. These words may be defined as "meaningful" words, based on domain knowledge.

Key words may then be identified and weighted, during the modelling process.

Existing topic modelling may be performed on transaction data and IVR data to label calls. Voice-to-text data can be very messy and complicated therefore hard to use to assign call purpose, although may be more accurate than transaction data or IVR data.

Figure 3:
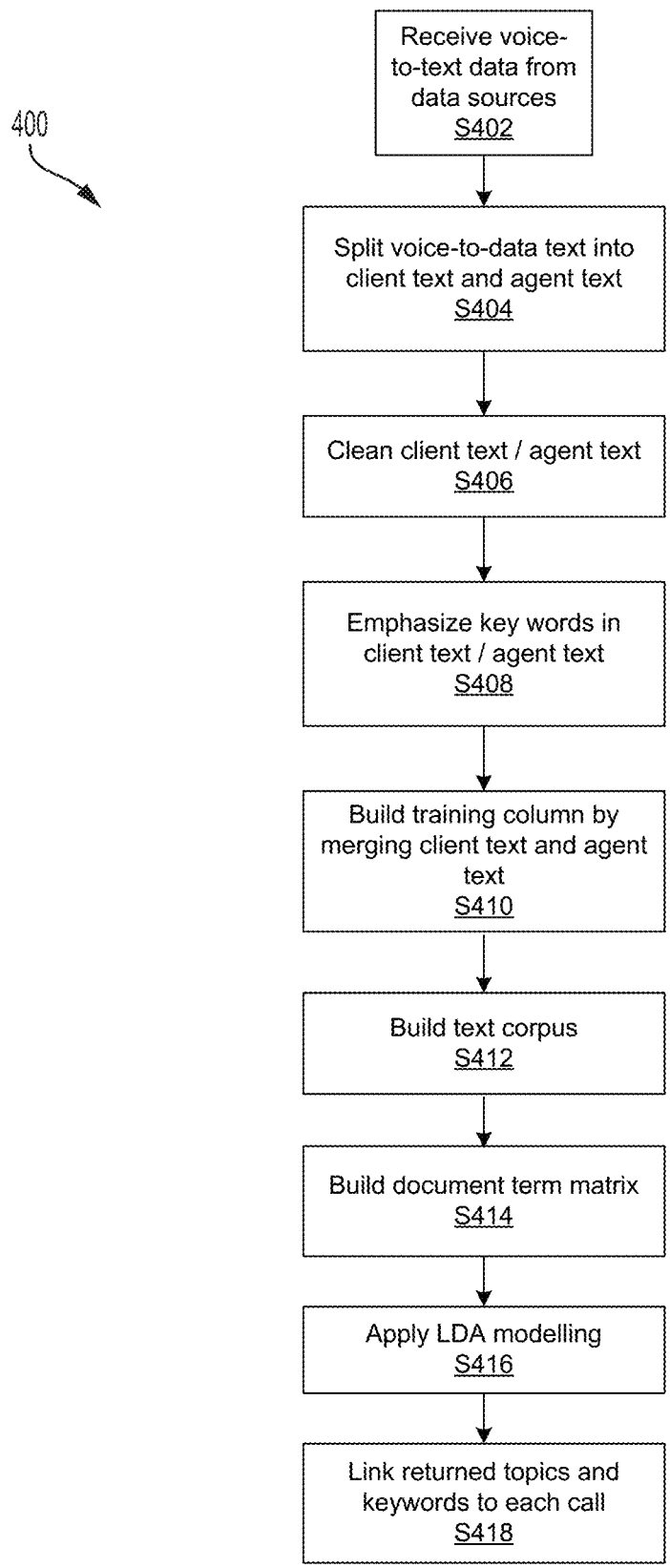
FIG. 3 is a flow diagram of a method for topic modeling of voice-to-text data, according to an embodiment.

The steps of a method 400 of performing topic modeling on voice-to-text data, in an embodiment, are shown in FIG. 3 and described below. FIG. 3 is a flowchart of method 400 for building a topic classifier model 316, for example, in a training phase and a testing phase, implemented by system 100. The blocks are provided for illustrative purposes. Variations of the blocks, omission or substitution of various blocks, or additional blocks may be considered. Blocks S402 and onward may be performed by processing device(s) 204 at electronic device 200.

In some embodiments, topic modelling may be used to discover "topics" that occur in a data set, for example, identifying topics in a set of documents or topics in voice-to-text data representative of a voice call. The "topics" may represent clusters of similar words.

In some embodiments, voice-to-text data may be used with a topic model. Conveniently, voice-to-text data may be used to develop a more advanced call purpose assignment than conventional techniques.

Topic modeling may be performed on voice-to-text data of a recording of a conversation between a client and call centre agent. In an example, topic modeling may be performed on data in a single business line, for example, cards line at a banking institution.

At block S402, incoming voice-to-data text is received from one or more data sources, containing text content of the conversation between the client and the agent. The received voice-to-data text may be associated with metadata indicating call date, a connection identifier, and which of the client and agent is speaking in the associated voice-to-data text.

In an example, a hundred conversations may be used as training data.

At block S404, using the metadata, the voice-to-data text is split into two parts: client text (representing the client's speech from the conversation), and agent text (representing the agent's speech form the conversation).

Following block S404, blocks S406 and S408 may be performed on each of the client text and agent text, concurrently, or in sequence.

At block S406, that data set is cleaned by removing punctuation and stop words.

In some embodiments, voice-to-text data being analyzed may further contain IVR data. To further clean the data, IVR data may be removed such that only the content of the conversation remains in the data. In some embodiments, the data may not contain IVR data.

In some embodiments, some confused words, for example, "no problem" may also be removed from the data.

In some embodiments, words may be replaced with the root, or stem, of each word.

At block S408, key words in the data that are to be emphasized may be weighted by duplicating them, or reproducing the word by a multiple factor based on the relevance of the word.

At block S410, a training column is built by merging resulting agent and client text. Merging is based on an intersection of what the agent and client are talking about.

At block S412, a text corpus dictionary is built, for example, using a "bag-of-words" model, a vector space model that is used to extracts features from text for use in modeling, and in this case is used in language modeling. This text corpus is built from all training conversations, for example, a hundred conversations combined into a single corpus. Within the corpus, each unique word from all of the conversations is identified, and assigned an identifier, as well as the number of instances of each word.

At block S414, a document term matrix is built, using the dictionary and linking to the word identifiers of block S412. The document term matrix describes the frequency of terms that occur in the text corpus dictionary.

At block S416, a latent Dirichlet allocation (LDA) learning algorithm is applied to the document term matrix. LDA provides topic modelling to identify topics in the document term matrix.

Topics and the number of topics may be selected in advance. In an example, a user may predetermine a fixed set of topic categories, seeking to identify words to be associated with them.

In some embodiments, the number of topics may be set at 50, 40, 30, or 23. Additionally, a number of variables and parameters of the model may be set. A set of 23 topics may provide more consistent resulting sets of topic-words.

The LDA model set for 23 topics may return 23 topics, and for each topic, the keywords that define the topic. By examining the keywords, a call purpose may be determined.

An overview of an LDA model can be described as follows. To infer topics in a corpus, a generative process is used for a corpus D consisting of documents M each of length $N_i$:

(1) Choose $\theta_i \sim Dir(\alpha)$, where $i \in \{1, \ldots, M\}$ and $Dir(\alpha)$ is a Dirichlet distribution with a symmetric parameter $\alpha$ which typically is sparse ($\alpha < 1$).

(2) Choose $\varphi_i \sim Dir(\beta)$, where $k \in \{1, \ldots, K\}$ and $\beta$ typically is sparse.

(3) For each of the word positions i,j, where $i \in \{1, \ldots, M\}$ and $j \in \{1, \ldots, N_i\}$, (a) Choose a topic $z_{i,j} \sim$ Multinomial $(\theta_i)$ and (b) Choose a word $w_{i,j} \sim$ Multinomial$(\varphi_{z_{i,j}})$.

where multinomial distribution refers to the multinomial with only one trial, which is also known as the categorical distribution; $\alpha$ is the parameter of the Dirichlet prior on the per-document topic distributions; $\beta$ is the parameter of the Dirichlet prior on the per-topic word distribution; $\theta_i$ is the topic distribution for document i, $\varphi_k$ is the word distribution for topic k; $z_{ij}$ is the topic for the j-th word in document i; and $w_{ij}$ is the specific word.

At block S418, in an example, in a testing phase, the topics and keywords returned by the trained topic classifier model 316, in an example, an LDA model as described with reference to blocks S402 to S416 above, are linked back to each call. By examining the keywords associate with each topic, and the defined topic, it may be possible to identify the call purpose. In some embodiments, a topic with the highest probability for a call may be mapped to that call's purpose.

In some embodiments, the model may have a live feed to data so it remains as accurate as possible, as the model may be continually re-trained, tested and refine an algorithm that will predict call purpose, and will continually improve as more data is included.

Method 400 generates a trained topic classifier model 316 which can then classify call topics, using call data as a corpus applied to topic classifier model 316, to determine what a call is about.

It should be understood that one or more of the blocks may be performed in a different sequence or in an interleaved or iterative manner.

Figure 4:
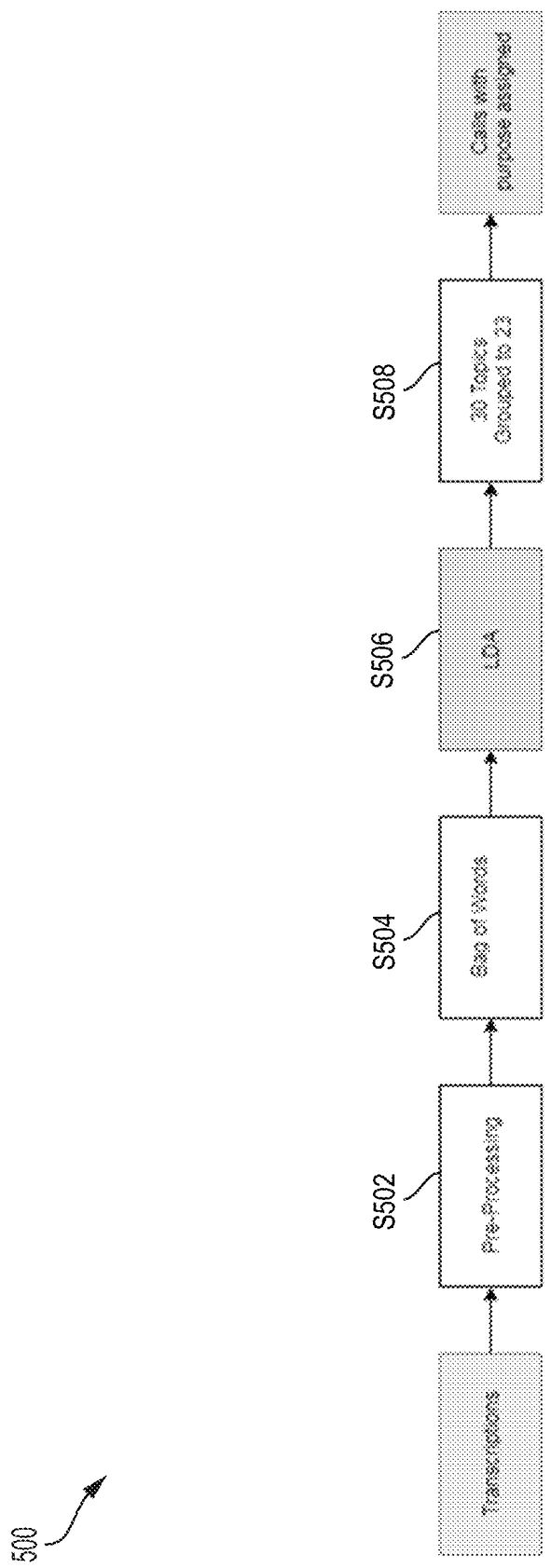
FIG. 4 is a flow diagram of a method for classifying data using a topic classifier model, according to an embodiment.

FIG. 4 is a flow diagram of a method 500 for classifying data using topic classifier model 316, according to an embodiment. The blocks are provided for illustrative purposes. Variations of the blocks, omission or substitution of various blocks, or additional blocks may be considered. Blocks S502 and onward may be performed by processing device(s) 204 at electronic device 200.

At block S502, a data source such as transcriptions of calls are pre-processed. In some embodiments, pre-processing can include performance of one or more of blocks S402 to S414.

In some embodiments, pre-processing can include one or more of tokenization by splitting the text into sentences and the sentences into words and making the words lowercase and removing punctuation; removing words that have fewer than 3 characters; removing stopwords; lemmatizing words by changing words in the third person to first person and verbs in past and future tenses are changed into present; and stemming words by reducing words to their root form.

At block S504, a bag of words from the data source are formed.

At block S506, LDA is applied to the bag of words. LDA may be run using bag of words model, or in some embodiments, TF-IDF (frequency-inverse document frequency) or word vectors.

At block S508, topics generated by the LDA may be grouped, generating calls with purpose assigned.

Method 500 may be unsupervised.

It should be understood that one or more of the blocks may be performed in a different sequence or in an interleaved or iterative manner.

Once the details of the voice call portion of the client journey are modeled, for example, by way of topic classifier model 316, the voice call can be linked to other aspects of the client's interactions with the organization, for example, to determine or further refine a call purpose, predict what topic or category a client would call about, for example, using topic prediction model 318, or predict whether a client will call a call center, for example, using call prediction model 320.

In some embodiments, other data sources such as call centre data, customer demographics, mobile and website statistics may be linked to voice-to-text data from above.

Each client may be associated with a unique identifier, for example a Service Reference File (SRF) number. Data associated with the same client SRF may be linked.

Customer demographics may provide a comprehensive overview on the type of customer, and may be used to make customer groupings based on behaviour and similar demographic information.

Mobile and website statistics such as Google Analytics may provide data on the mobile aspect of a client's journey, and highlight page points in the customer's digital journey.

In an example, client demographics such as Google Analytics Sessions may be determined by setting one session for every hour, and summing up the number of sessions. This means that if a user has fifteen events in one hour, this would count as one session. One event every hour for two hours would count as two sessions. The data may be joined up and then used to determine if a customer type would call.

Based on call purpose, clients may be clustered based on their behaviours. In an embodiment, call purpose associated with a client may be used to create customer groups.

Customer groups may be used by many departments in an organization, such as the marketing team to increase effectiveness of advertisements or better target new product roll outs. Clustering may also be used to predict what topic or category a client would call about, as described in further detail with reference to topic prediction model 318, below.

Clustering may be done using k-means or DBSCAN, described in further detail below.

K-means is a type of unsupervised machine learning. It will find groups in unlabeled data (meaning no defined categories or groups), each ground having a centroid (center of the group). The number of centroids (groups) is given by k. Each data point is assigned to a single cluster (or group).

At a data assignment step, each centroid defines one of the clusters. Each data point is assigned to its nearest centroid, based on the squared Euclidean distance.

If $c_i$ is the collection of centroids in set $C_1$ then each data point x is assigned to a cluster based on:

$$\underset{c_i \in C}{\mathrm{argmin}}\, dist(c_i, x)^2$$

where $dist(\cdot)$ is the standard ($L_2$) Euclidean distance. Let the set of data point assignments for each $i^{th}$ cluster centroid be $S_i$.

At a centroid update step, the centroids are recomputed. This is done by taking the mean of all data points assigned to that centroid's cluster:

$$c_i = \frac{1}{|S_i|} \sum_{x_i \in S_i} x_i$$

In some embodiments, the same dataset used for the call purpose determination may be used for clustering.

DBSCAN is a clustering algorithm that will cluster together only strongly correlated points and mark others as outliers. It requires eps (e) and the minimum number of points required to form a dense region before it can begin (minPts).

The operation of topic prediction model 318 of machine learning code 312, performed by processing device(s) 204, is described below.

Topic prediction model 318 may use client demographics and details about their online banking web sessions, in combination with topic classifier model 316, to predict what topic a client would be likely to call about.

Call data source may not have "call purpose" labels already attached, and thus, topic classifier model 316 may be created and/or used to first label each call with an estimated topic. Then, a supervised learning approach using, in an example, an XGBoost algorithm, to train topic prediction model 318 I with the estimated labels and seek to find relationships to the client demographic data and browsing records.

Each browsing record of an online banking page may provide these features: the unique page itself, the amount of time spend on that page and the time interval between starting that page and the next (if any) client call.

Figure 5:
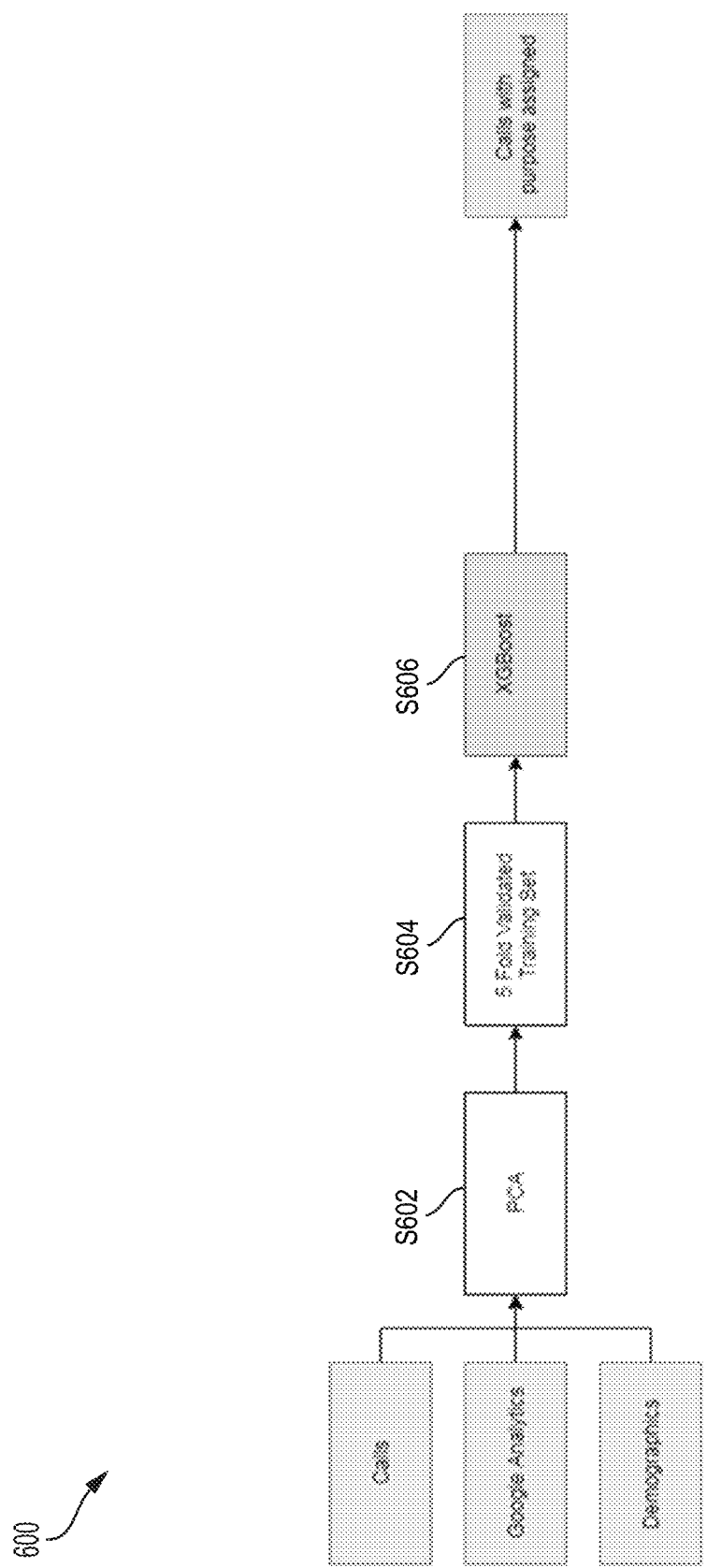
FIG. 5 is a flow diagram of a method for predicting a call topic using a topic prediction model, according to an embodiment.

FIG. 5 is a flow diagram of a method 600 for predicting a call topic using topic prediction model 318, according to an embodiment. The blocks are provided for illustrative purposes. Variations of the blocks, omission or substitution of various blocks, or additional blocks may be considered. Blocks S602 and onward may be performed by processing device(s) 204 at electronic device 200.

At block S602, principal component analysis (PCA) is applied to call data, browsing data or other Google Analytics data, and demographics data.

At block S604, k-fold cross validation may be applied, for example, with k equal to 5 or 10, to generate a k fold validated training set. In an example, the original sample (data such as principal components generated by PCA at block S602), is randomly partitioned into k equal size subsamples. Of the k subsamples, a single subsample is retained as the validation data for testing the model, and the remaining k−1 subsamples are used as training data.

At block S606, a supervised machine learning approach, for example, using an XGBoost algorithm is employed to train topic prediction model 318, generating a purpose assigned to calls.

It should be understood that one or more of the blocks may be performed in a different sequence or in an interleaved or iterative manner.

The operation of call prediction model 320 of machine learning code 312, performed by processing device(s) 204, is described below.

Call prediction model 320 uses client demographics and an aggregate measure of each client's online banking time to estimate whether a client would call or not.

In some embodiments, call prediction model 320 may predict a probability of clients calling on a timescale, such as "soon" or "eventually", in an example, using long short-term memory (LSTM) or Cox-Survival modelling.

The following algorithms may be applied to topic classifier model 316, above, and may predict if a customer will call an organization by a call prediction model 320.

Logistic regression is a regression model for binary variables, used for predictive analysis. It can explain the relationship between one dependent binary variable and +1 nominal, ordinal, interval, or ratio-level independent variables.

$$\text{logit}(p) = \log\left(\frac{p(y=1)}{1-(p=1)}\right) = \beta_0 + \beta_1 x_{i2} + \beta_2 \cdot x_{i2} + \_ + \beta_p \cdot x_{in}$$

for $i = 1 \ldots n$.

Figure 7:
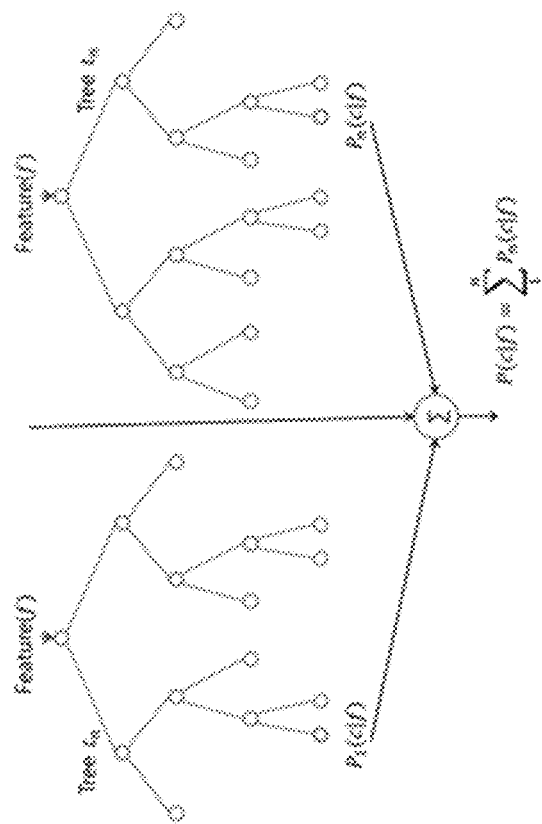
FIG. 7 is a schematic diagram of a random forest, according to an embodiment.

Random forests is a machine learning algorithm that is simple and can be used for classification and regression tasks. Random forests build multiple decision trees and merges them together to get a more accurate and stable predictions, shown by way of an example random forest model 800 in FIG. 7.

Support vector machine is a supervised machine learning algorithm that is used for classification.

Figure 6:
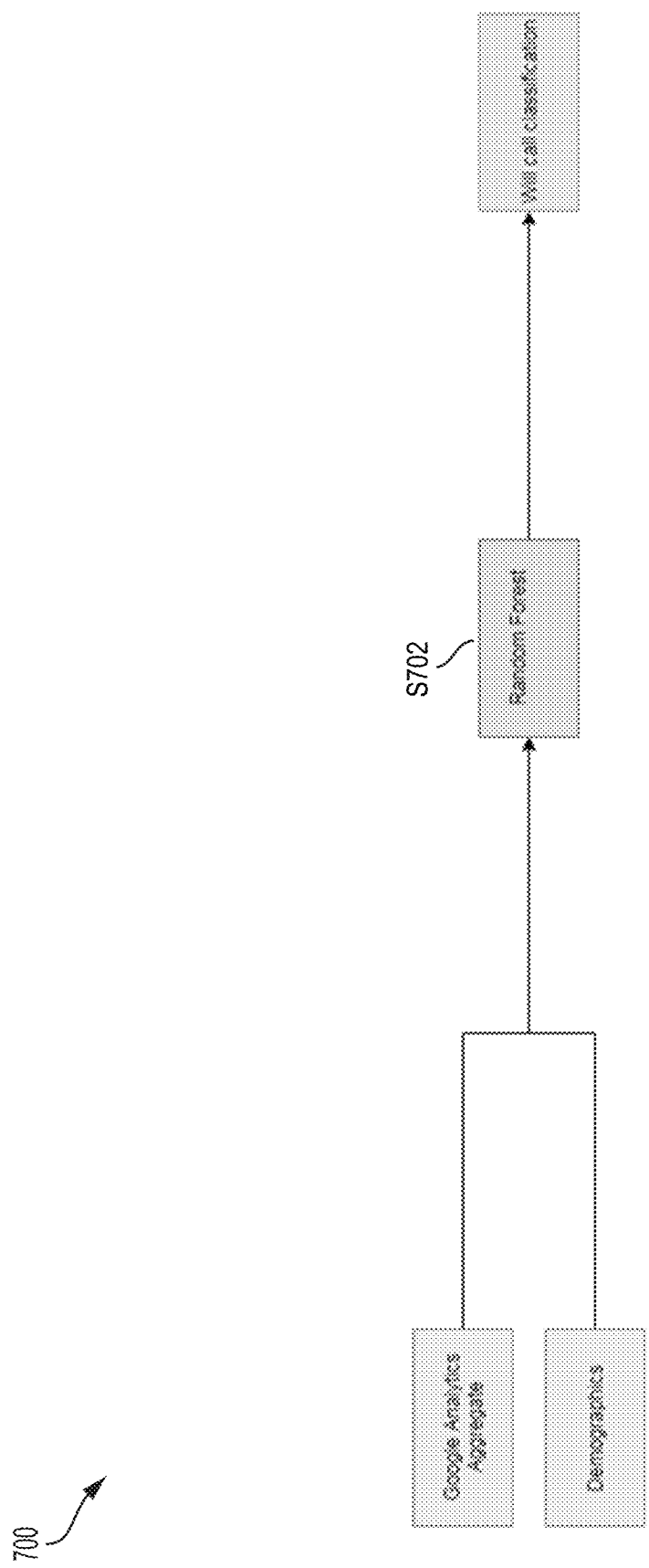
FIG. 6 is a flow diagram of a method for predicting a call occurrence using a call prediction model, according to an embodiment.

FIG. 6 is a flow diagram of a method 700 for predicting a call occurrence using call prediction model 320, according to an embodiment. The blocks are provided for illustrative purposes. Variations of the blocks, omission or substitution of various blocks, or additional blocks may be considered. Block S702 may be performed by processing device(s) 204 at electronic device 200.

At block S702, a random forest is applied to Google Analytics aggregate data and demographics data, to generate a classification as to whether a client will call. In some embodiments, LSTM may be used at block S702.

It should be understood that one or more of the blocks may be performed in a different sequence or in an interleaved or iterative manner.

Analytical models described herein may be used to predict which clients are likely to call a call centre and also to predict what their call might be about. Systems and methods described herein may allow for promptly and proactively offering a client a self-service option to an immediate service issue, improving client satisfaction.

The call purpose modelling and overall trend analysis and customer journey, as well as call prediction, may be presented on a platform such as system 100, and provided to an end user.

In an example, forecasters, upper management, and call centre agents are all possible users who could benefit from the information. The ultimate benefactor may be the client, as organization may be able to improve the customer experience.

Conveniently, an organization may be able to more efficiently staff the agents of the call centre and could potentially save an organization staffing and operation budget. There may be financial benefits from either eliminating a portion of calls or reducing the call time by directing calls to an appropriate agent the first time.

While embodiments are described herein with reference to data such as call data, analytics such as browsing history, and demographics, it is contemplated that systems and methods described herein may be applied to other suitable data sources, for example, transcripts from other communications, conversations or other documents sources.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for classifying a topic of a communication using a topic classifier model, the method comprising:
   receiving text data converted from a voice communication between two individuals;
   splitting the text data into two text data portions including a respective text data portion for each individual of the two individuals;
   modifying the respective text data portion for each individual by removing stop words and duplicating key words in the respective text data portion;
   merging the respective modified text data portion from each individual of the two individuals to form a text corpus;
   classifying one or more topics of the text corpus using a topic classifier model;
   identifying a purpose of the voice communication based on the one or more topics from the topic classifier model; and
   storing the one or more topics from the topic classifier model in association with the voice communication.

2. The computer-implemented method of claim 1, further comprising:
   building a document term matrix based on the text corpus and a frequency of terms that occur in the text corpus; and
   wherein classifying the one or more topics of the text corpus comprises determining the one or more topics based on the document term matrix using the topic classifier model.

3. The computer-implemented method of claim 1, wherein the topic classifier model includes a latent Dirichlet allocation (LDA) model.

4. The computer-implemented method of claim 1, wherein the one or more topics and a number of the one or more topics are predetermined.

5. The computer-implemented method of claim 1, wherein the stop words are defined by a predetermined stop words list.

6. The computer-implemented method of claim 1, wherein the modifying the respective text data portion for each individual comprises one or more of:
   tokenizing the respective text data portion by:
      splitting the respective text data portion into sentences;
      splitting the sentences into words; and
      making the words lowercase and removing punctuation;
   removing words that have fewer than three characters from the respective text data portion;
   lemmatizing one or more verb words in the respective text data portion by changing verb words in past and future tenses into a corresponding present tense; and
   stemming one or more words in the respective text data portion by reducing the one or more words to root form.

7. The computer-implemented method of claim 1, further comprising: linking the topic classifier model to other data sources.

8. The computer-implemented method of claim 7, wherein the other data sources include at least one of: call centre data, customer demographics, and mobile and website statistics.

9. The computer-implemented method of claim 7, further comprising: applying principal component analysis to the text data and the other data sources to generate principal components; applying a topic prediction model to the principal components to predict topics an individual would call about.

10. The computer-implemented method of claim 8, further comprising: applying 5-fold cross validation to the principal components to generate a 5-fold validated training set.

11. The computer-implemented method of claim 1, further comprising: during a training phase, building the text corpus from training data including multiple communications.

12. The computer-implemented method of claim 1, further comprising: clustering the two individuals based on the purpose of the voice communication.

13. The computer-implemented method of claim 12, wherein the clustering includes performing k-means unsupervised machine learning.

14. The computer-implemented method of claim 13, further comprising: defining customer groups based on the clustering.

15. The computer-implemented method of claim 1, further comprising: applying the topic classifier model to a call prediction model to predict if an individual will call an organization.

16. The computer-implemented method of claim 15, wherein the call prediction model includes a random forest.

17. The computer-implemented method of claim 15, wherein the call prediction model includes a long short-term memory (LSTM) model.

18. The computer-implemented method of claim 1, wherein the two individuals include a client and an agent at a call centre and the text data is voice-to-text data.

19. A computer system comprising:
a processor; and
a memory in communication with the processor, the memory storing instructions that, when executed by the processor, cause the system to:
receive text data converted from a voice communication between two individuals;
split the text data into two text data portions including a respective text data portion for each individual of the two individuals;
modify the respective text data portion for each individual by removing stop words and duplicating key words in the respective text data portion;
merge the respective modified text data portion from each individual of the two individuals to form a text corpus;
classify one or more topics of the text corpus using a topic classifier model;
identify a purpose of the voice communication based on the one or more topics from the topic classifier model; and
store the one or more topics from the topic classifier model in association with the voice communication.

20. A non-transitory computer-readable medium having computer executable instructions stored thereon for execution by one or more computing devices, that when executed perform:
receiving text data converted from a voice communication between two individuals;
splitting the text data into two text data portions including a respective text data portion for each individual of the two individuals;
modifying the respective text data portion for each individual by removing stop words and duplicating key words in the respective text data portion;
merging the respective modified text data portion from each individual of the two individuals to form a text corpus;
classifying one or more topics of the text corpus using a topic classifier model;
identifying a purpose of the voice communication based on the one or more topics from the topic classifier model; and
storing the one or more topics from the topic classifier model in association with the voice communication.

* * * * *